United States Patent [19]

Luciano

[11] Patent Number: 5,154,111

[45] Date of Patent: Oct. 13, 1992

[54] DEVICE FOR OBTAINING HOT DRINKS IN SOLUTION

[75] Inventor: Paoletti Luciano, Florence, Italy

[73] Assignee: Spidem S.r.l., Milan, Italy

[21] Appl. No.: 618,175

[22] Filed: Nov. 26, 1990

[30] Foreign Application Priority Data

Nov. 28, 1989 [IT] Italy ................................. 9570 A/89

[51] Int. Cl.⁵ .............................................. A47J 31/41
[52] U.S. Cl. .................................. 99/289 R; 99/293;
99/294; 99/302 R; 261/DIG. 16; 261/DIG. 76
[58] Field of Search ............... 99/279, 289 R, 289 DB,
99/289 P, 290, 291, 293, 295, 300, 302 R, 294;
426/433, 506; 126/369, 369.1, 369.3, 381, 389;
261/76, 121.1, DIG. 16, DIG. 76

[56] References Cited

U.S. PATENT DOCUMENTS

| | | | |
|---|---|---|---|
| 3,551,164 | 12/1970 | Weaver | 426/433 |
| 4,036,121 | 7/1977 | Bieri | 99/289 R |
| 4,083,295 | 4/1978 | Hollingsworth | 99/302 R |
| 4,188,863 | 2/1980 | Grossi | 99/289 R |
| 4,271,753 | 6/1981 | Neely | 99/289 R |
| 4,632,024 | 12/1986 | Cortese | 99/293 |
| 4,741,260 | 5/1988 | Bolivar | 126/369 X |
| 4,784,050 | 11/1988 | Cavalli et al. | 99/289 R |
| 4,800,805 | 1/1989 | Mahlich et al. | 99/293 |
| 4,858,522 | 8/1989 | Castelli | 99/289 R X |
| 4,922,810 | 5/1990 | Siccardi | 99/293 X |
| 4,936,199 | 6/1990 | Ruggin et al. | 99/289 R |
| 4,970,948 | 11/1990 | Gianelli | 99/289 R X |

FOREIGN PATENT DOCUMENTS

243326 10/1987 European Pat. Off. .............. 99/293

Primary Examiner—Harvey C. Hornsby
Assistant Examiner—C. Cooley
Attorney, Agent, or Firm—McGlew & Tuttle

[57] ABSTRACT

A device for obtaining hot drinks in solution, especially hot drinks made from a freeze-dried product. The freeze-dried product is dispensed in a predetermined dose into a treatment chamber. The treatment chamber is closed and air, liquid, and steam are injected into the treatment chamber in order to dissolve the predetermined dose and to create the hot drink. The predetermined dose is substantially mixed and dissolved in the liquid, steam and air and removed from the treatment chamber through an outlet in a cover of the treatment chamber and through a valve in the bottom of the treatment chamber. The supply of air to the treatment chamber can be interrupted if the hot drink is desired without froth.

12 Claims, 8 Drawing Sheets

DEVICE FOR OBTAINING HOT DRINKS IN SOLUTION

FIELD OF THE INVENTION

The present invention relates to a method and a device for obtaining hot drinks in solution.

BACKGROUND OF THE INVENTION

It is known that the so-called traditional cappuccino is a mixture of two liquids, one based on coffee and the other based on milk, possibly emulsified by means of a steam nozzle, to the infusion of espresso coffee.

Units for emulsifying milk with air and steam are also known, and have a chamber into which an inflow pipe for the steam, an intake pipe for the milk, and an intake pipe for the air, flow. All these known devices nevertheless always involve adding the emulsified milk to the infusion of coffee which has been obtained separately. It is further known that automatic dispensers of hot drinks provide cappuccinos which are obtained by mixing a solution of milk with a solution of coffee, the mixture being obtained by agitation with electromechanical means.

SUMMARY AND OBJECTS OF THE INVENTION

The aim of the present invention is to propose a method and a device which make it possible to obtain, in a cup, hot drinks in solution such as cappuccino, coffee, chocolate, milk, tea, broth and similar drinks, using freeze-dried products.

For the cappuccino, the solution liquid is milk which can also be in natural form.

This aim has been achieved according to the invention by using an operational method which consists of:

forming a predetermined does of freeze-dried product;

loading the dose thus formed of freeze-dried product into a treatment chamber;

supplying the treatment chamber with a solution of liquid and possibly air with which to dissolve, mix and possibly emulsifying the freeze-dried product contained therein, obtaining the corresponding drink, the solution liquid and the air being supplied by means of steam under pressure;

collecting in a cup the drink thus obtained;

interrupting the supply of the steam and thus interrupting the supply of the solution liquid and of the air;

emptying the treatment chamber of the freeze-dried product into a collection cup for the drink.

In order to implement the method, a device is used, which is characterized in that it comprises:

means for forming a predetermined dose of freeze-dried product;

means for dissolving and mixing with the solution liquid, and possibly emulsifying with air, the predetermined dose of freeze-dried product, with a treatment chamber with which at least one inlet channel is associated for the admission of the solution liquid and of the air by means of steam under pressure;

means for supplying the solution liquid for the freeze-dried product and the emulsion air into the treatment chamber;

means for emptying the treatment chamber; means for the movement of the various moving parts, comprising a disk which rotates about a horizontal axis and is provided with a number of cams;

means for starting and stopping the device in the absence of steam under pressure.

The advantages obtained by virtue of the invention consist essentially in that the device is of economical construction, functions autonomously, that is to say, without the use of electric power, and operates according to a rapid, hygienic and reliable cycle even after a long period of use.

These and other advantages and characteristics of the invention will be understood to a greater and better extent by any expert by means of the description which follows and with the aid of the attached drawings, which are given by way of practical exemplification of the invention but are not to be considered in a limitative sense.

DETAILED DESCRIPTION OF THE PREFERRED EMBODIMENT

Reduced to its essential structure and with reference to the attached drawings, the method for obtaining cappuccinos with or without froth according to the invention consists of, in order, the following operational phases:

forming a predetermined dose of freeze-dried coffee;

loading the dose of coffee thus formed into a treatment chamber underneath;

closing the treatment chamber but allowing inlet of steam under pressure, of milk with emulsion air and allowing outlet of the cappuccino which is produced;

supplying, by means of steam under pressure, milk into the treatment chamber to dissolve and mix the coffee, and supplying air with which to emulsify the milk thus obtaining cappuccino with froth;

collecting the thus-formed cappuccino which flows from the treatment chamber into a cup;

interrupting the supply of steam under pressure and thus also interrupting the intake of the milk and the air;

emptying the treatment chamber into the cup for collection of the cappuccino.

Advantageously—according to the invention—it is envisaged that the predetermined dose of coffee is for one or more cups of cappuccino and that the capacity of the treatment chamber is independent of a cup of cappuccino.

Further, according to the invention, it is envisaged that all the arrangements for carrying out, in succession, the corresponding phases of the operational process are derived from a single control element.

Figure 2:
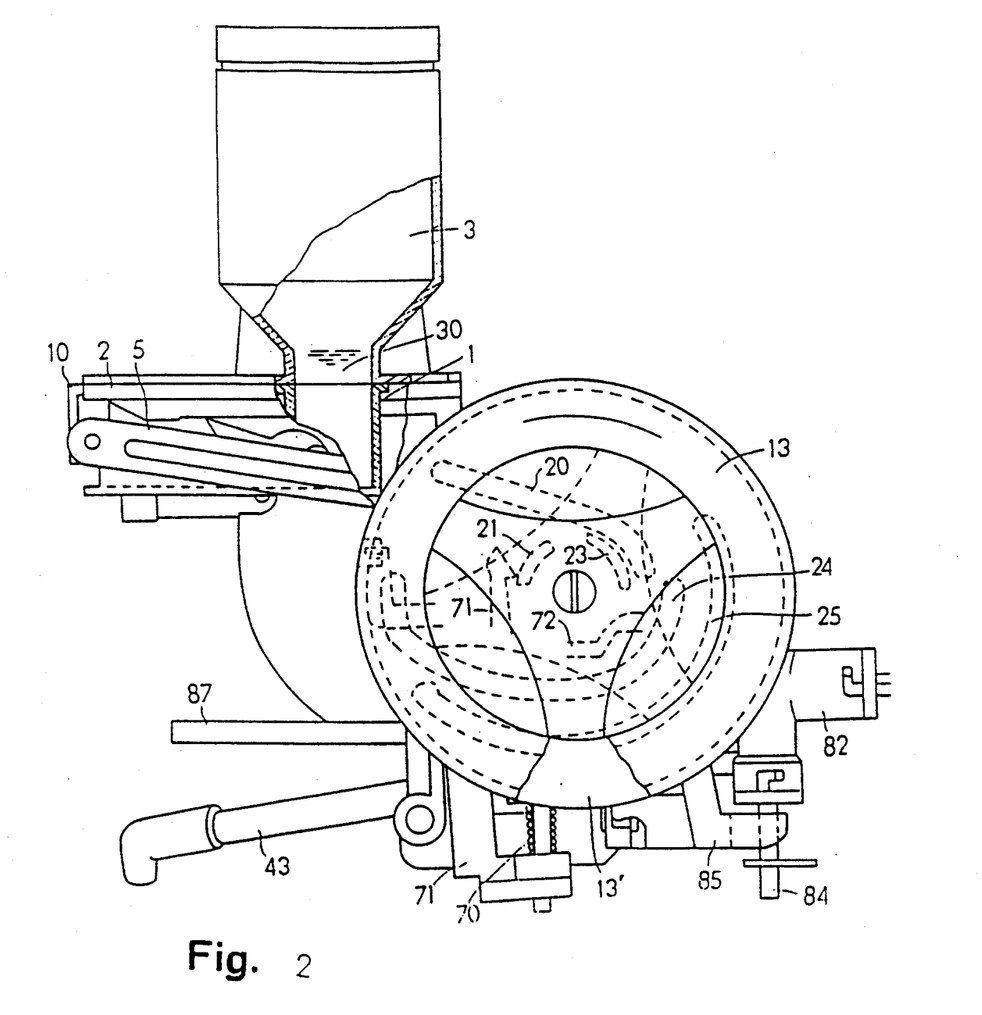
FIG. 2 represents a front view of the device in FIG. 1 in the start and end of the cycle state.
Figure 4:
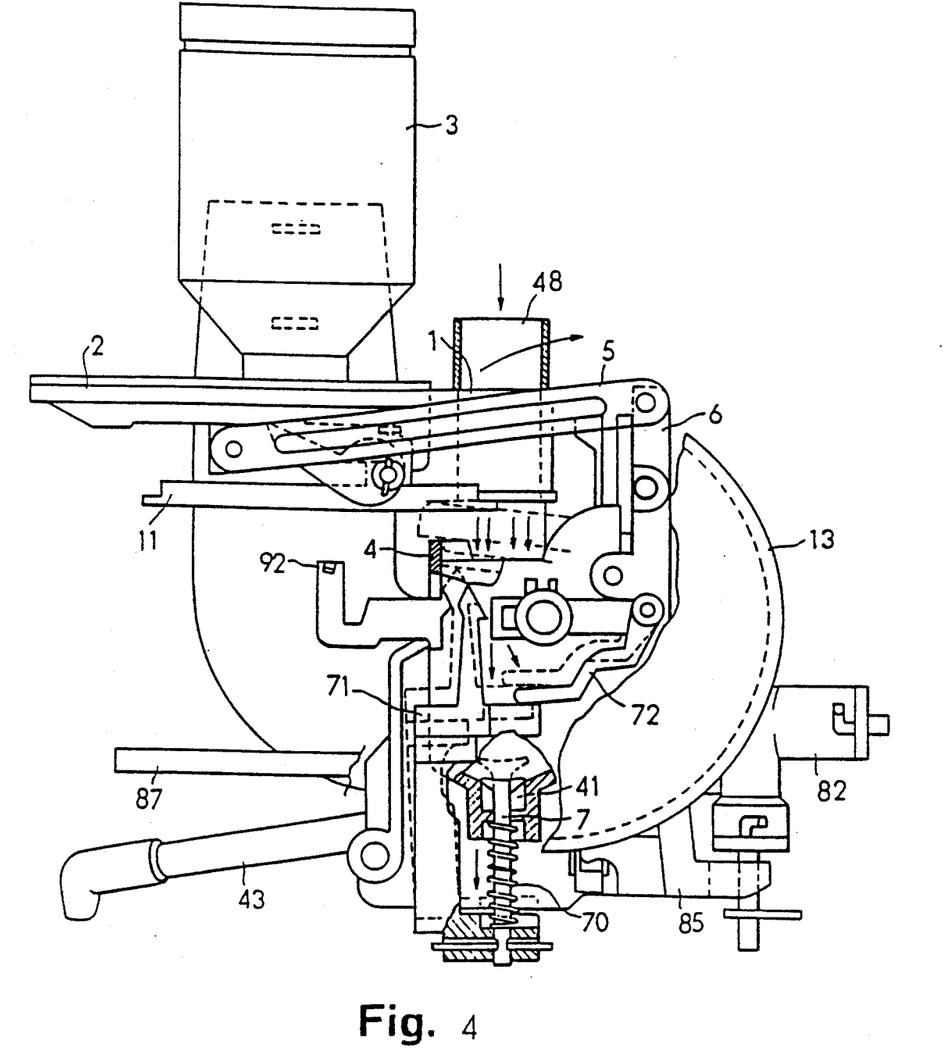
FIG. 4 represents a front view of the kinematic motion of the device in FIG. 2 in the phase of loading of the coffee into the treatment chamber.

As far as the device for implementing the method is concerned, it comprises, according to the invention:

A. Means for forming a predetermined dose of freeze-dried coffee, with a loader 1, as shown in FIG. 2, open in the region of the lower and upper ends. The loader 1 is integral with a body 10 which travels horizontally in a track 2 from a position for loading of the coffee, which is supplied by gravity from a magazine 3 above, to a position of discharge by gravity into a treatment chamber 4 underneath for the coffee. The travel is derived, by means of a connecting rod 5, with the movement of opening/closing, as shown in FIG. 4, of the cover 6 of the treatment chamber. The body 10 is closed at the top in order to intercept the mouth 30 of the magazine 3 during the outward travel, and during the return travel of the loader 1 from the treatment chamber 4. The body 10 is also associated with a lower plate 11 which is connected to the body 10 and slides in order to allow the lower plate 11 to intercept, at the bottom, the loader 1 during its entire travel, except in the position for discharging the coffee into the treatment chamber 4. At a higher level than the loader 1 and axially in relation to the treatment chamber 4, a diffuser 48 of downwardly flowing hot air is provided, with the function of cleaning the internal walls of the loader 1 after its emptying and with the further function of heating the walls so as to prevent the formation of condensation water there.

Figure 1:
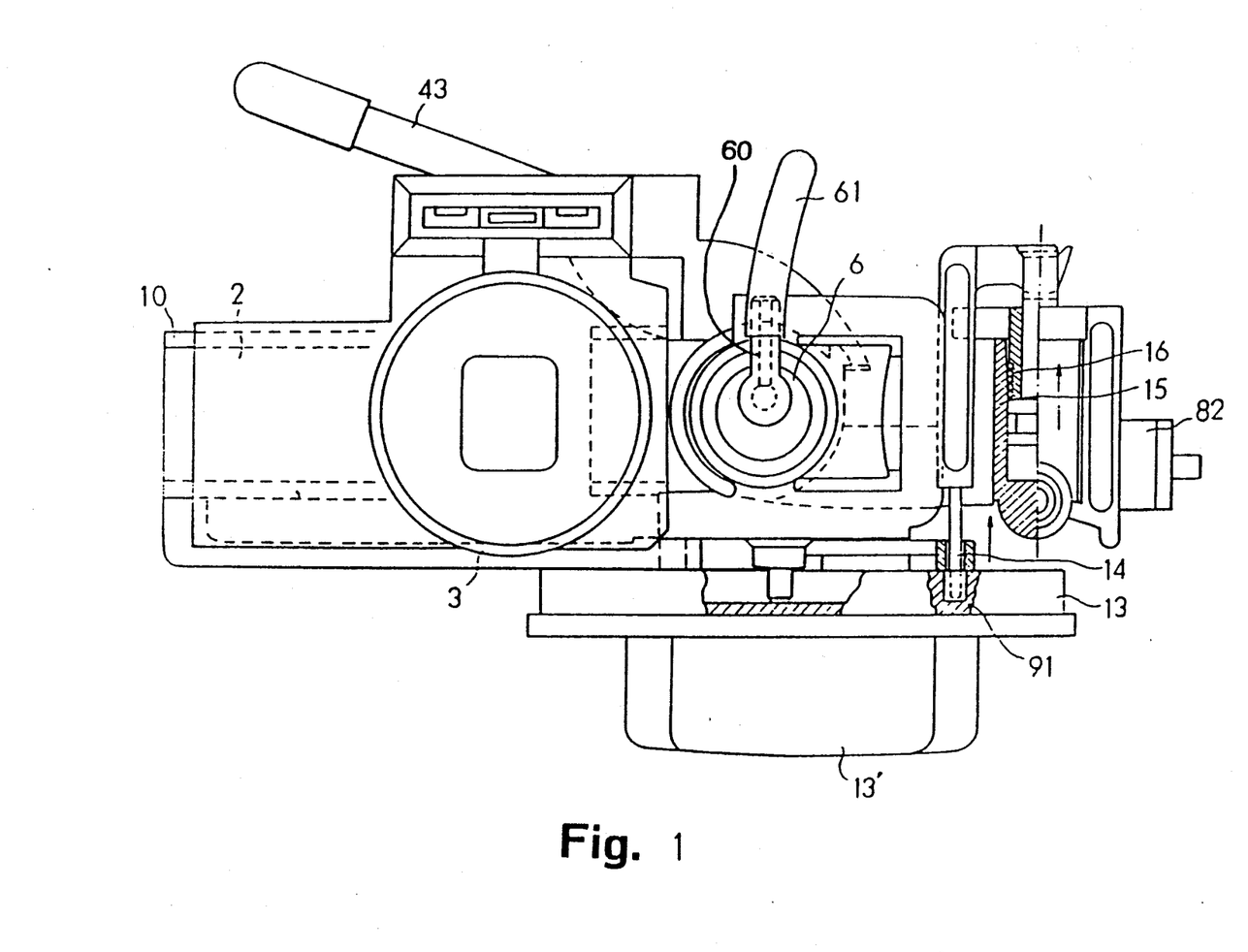
FIG. 1 represents a plan view of a device for obtaining cappuccinos with froth according to the invention in the start of cycle state.
Figure 6:
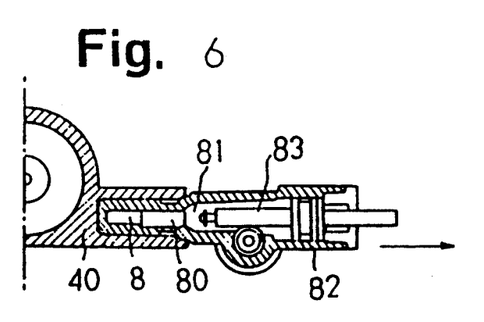
FIG. 6 represents in cross-section a detail of the intake unit for the mil for the device in FIG. 2.
Figure 7:
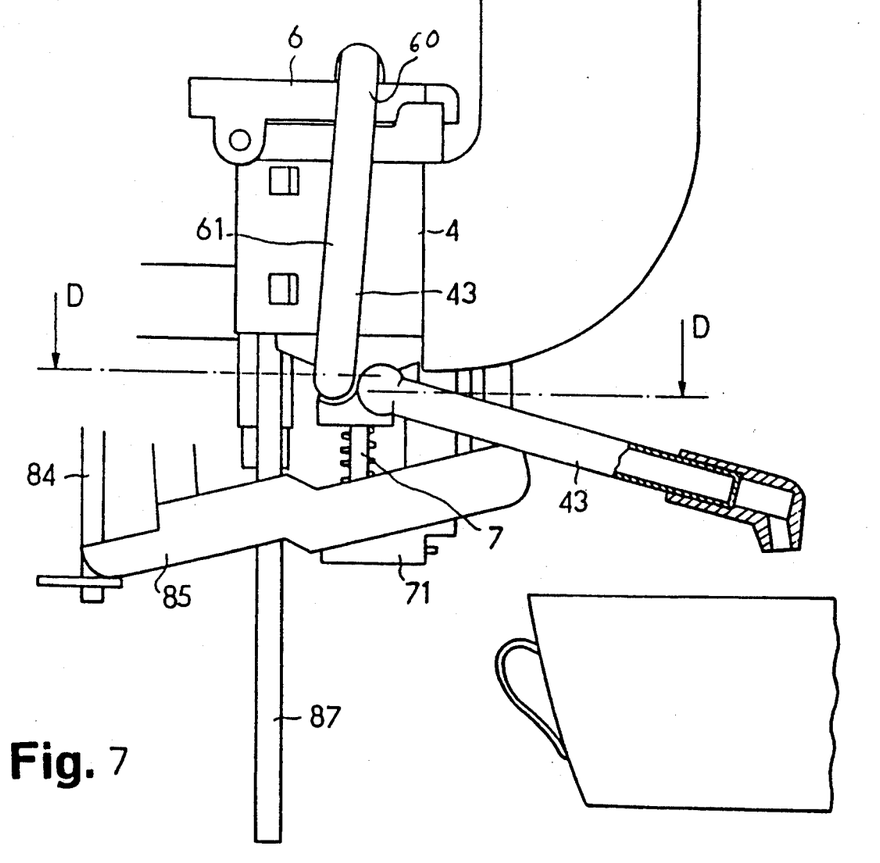
FIG. 7 represents a detail of the treatment chamber for the device in FIG. 2.
Figure 8:
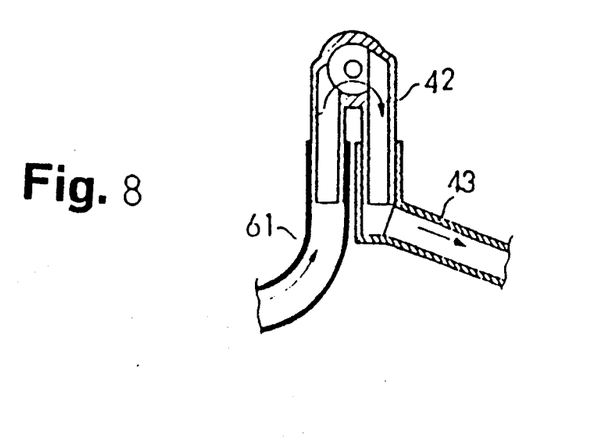
FIG. 8 represents a cross-section according to D—D in FIG. 7.

B. Means for dissolving and mixing the predetermined dose of freeze-dried coffee with emulsified milk in the treatment chamber 4 is provided. The treatment chamber 4 is provided with a cover 6 which rotates upwards, an outlet pipe 60 as shown in FIGS. 1 and 7, for removing the cappuccino just made, a lower opening 41, as shown in FIG. 4, for emptying with a sealing valve 7, and a lateral opening 40, FIGS. 5 and 6, for the admission of the milk and of the air by means of steam under pressure. It is envisaged that the opening 41 opens into a pipe 42, FIG. 8, which is prolonged in a tube 43, FIGS. 1, 2, 4, 5, 7, and 8, for the distribution of the cappuccino into a cup. Also the opening 41 opens into a flexible tube 61, FIGS. 1, 7 and 8, connected to the outlet pipe 60 of the cover 6 for the bringing forward of the cappuccino under formation. The cover 6 is rotated, in opening and in closing respectively, by a negative cam 20, FIG. 2, that is to say, one obtained by depression, in a disk 13. The disk 13 can rotate about a horizontal axis under the control of a hand-grip 13' which is integral with it. The valve 7 is controlled in closing and in opening respectively by a spring 70 and by a lever 71 which is subject to a positive cam 21 of the disk 13. The lever 71 being secured, in the closed state of the valve 7, by a further lever 72 which is subject to a corresponding positive cam 23 of the disk 13.

C. The means for supplying the milk solution and the air emulsion into the treatment chamber 4 comprises an intake chamber 8, FIGS. 5 and 6 which communicates with the treatment chamber 4. A steam pipe 80 for the steam under pressure, a pipe 9 for the milk, and an air channel 100 open into the treatment chamber 4. The steam under pressure, provided by a boiler (not shown in the drawing) is admitted into the intake chamber 8 through a nozzle 81 which is made to communicate with an operating cylinder 82 by means of an operating valve 83 which is opened by the piston of the same cylinder 82 when the latter is set in operation with the opening of the inlet valve 84 for the steam, under the action of a lever 85 which is subject to a cam 24 of the disk 13.

Figure 5:
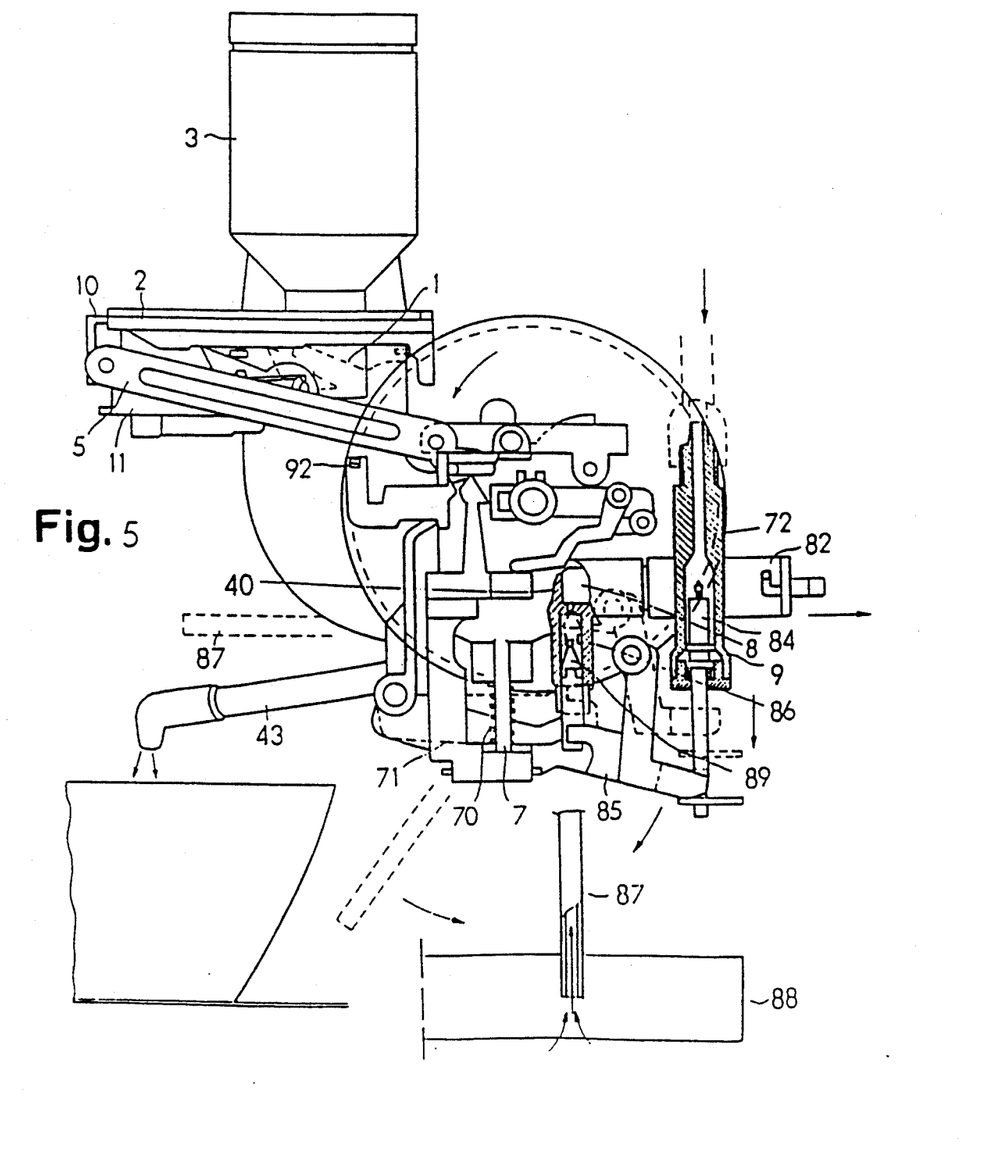
FIG. 5 represents a front view of the kinematic motion of the device in FIG. 2 in partial cutaway in the phase of production of the cappuccino with froth.

The milk is drawn into the intake chamber 8 through a calibrated nozzle 86, which is connected to an oscillating tube 87 which takes up from a receptacle 88, as soon as the inlet valve 89 is opened by means of the same lever 85 which operates the inlet valve 84 for the steam under pressure. The oscillation of the tube 87, from a horizontal rest position out of the milk to a vertical take-up position in the milk, is derived from a cam 25 of the movement disk 13.

Figures 9, 10, 11:
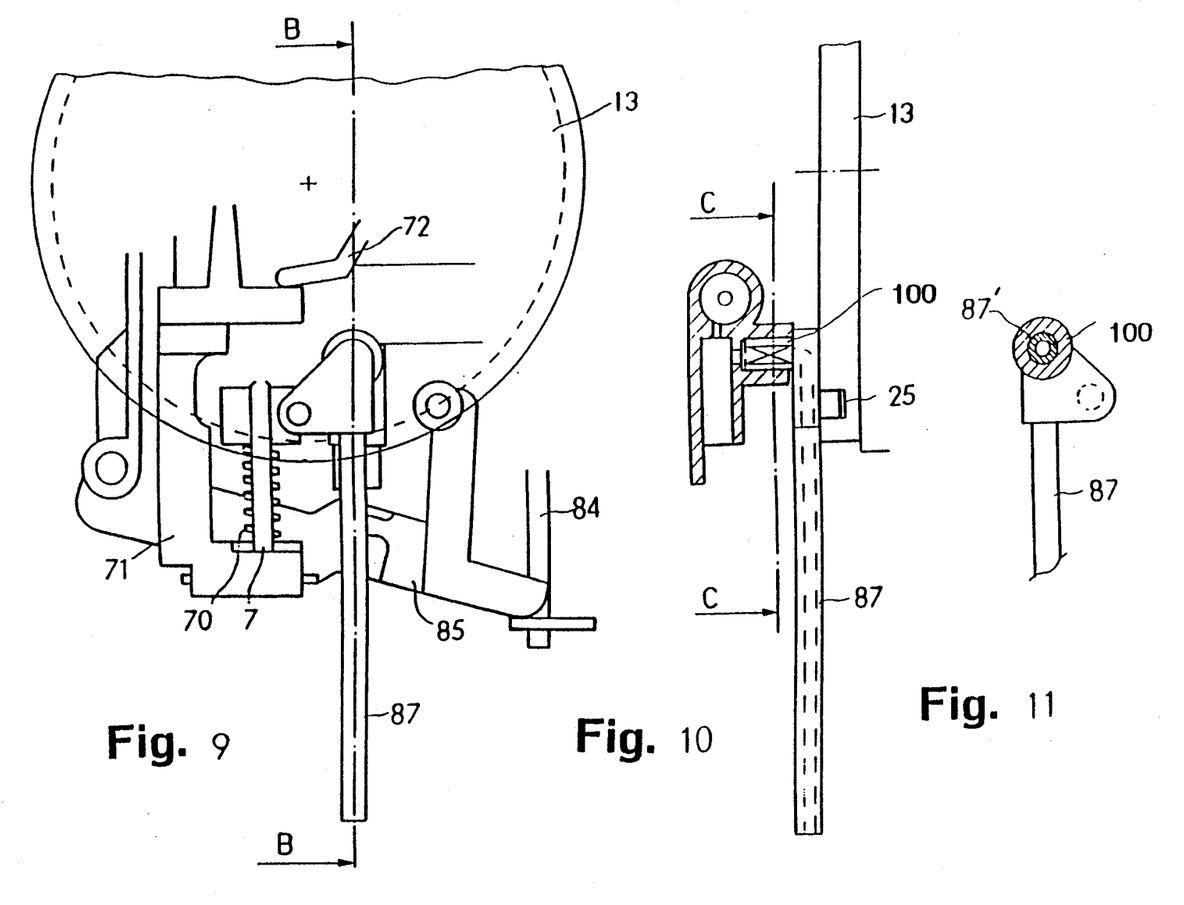
FIG. 9 represents a detail of the intake pipe for the milk in the operational state.
FIG. 10 represents a cross-section according to B—B in FIG. 9.
FIG. 11 represents a cross-section according to C—C in FIG. 10.

Lastly, the ambient air is drawn into the intake chamber 8 through a channel 100, shown in FIGS. 10 and 11, delimited by a flattening made on the external surface of the hollow shank 87' of the tube 87. It goes without saying that the air channel 100 can be closed in order to obtain cappuccino without froth.

D. The means for starting and stopping the device in the absence of steam under pressure, comprises a bar 14, shown in FIG. 1, which is subject to a spring 16 and associated with the shaft of an operating cylinder 15. The operating cylinder 15 is set in operation by the same steam under pressure in such a manner that, with the cylinder 15 empt, the free end of the bar 14, under the action of the spring 16, engages the disk 13 in a corresponding slot 91, locking the rotation of the control hand-grip 13', and, with the cylinder 15 under pressure, the bar 14 recedes, releasing the disk 13 and the associated control hand-grip 13'.

The device which has been described and illustrated, by virtue of the presence of the hand-grip 13', is of the semi-automatic type, but any expert knows well that the setting in operation of the disk 13 for movement of the device can be automated with simple known means.

Figure 3:
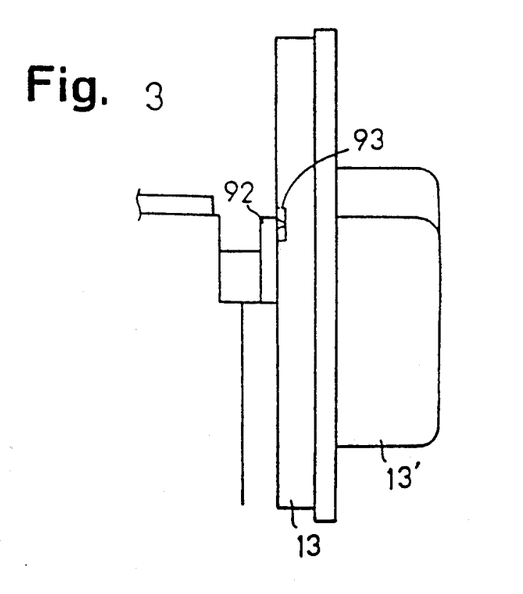
FIG. 3 represents a partial lateral view of the device in FIG. 1 with a detail of the security lock.

The functioning is as follows. At the start of each cycle, the cylinder 15 is under pressure, the disk 13 is released from the bar 14, but is retained by a tooth 92, as shown in FIG. 3, installed in a corresponding notch 93. The emptying valve 7 for the chamber 4 is open and the admission of steam, milk and air is intercepted. By rotating the hand-grip 13' in a clockwise direction by approximately 80°, the cover 6 of the chamber 4 is raised, the valve 7 closes, the dosing apparatus 1 advances and pours the dose of coffee in granules into the chamber 4; the hand-grip 13' is then rotated in a counterclockwise direction by approximately 160° in such a manner that the cover 6 is lowered and closes the chamber 4, the tube 87 is rotated by 90° towards the bottom, the lever 85 opens the valve 89 of the pipe 9 for the milk and the same lever 85 opens the inlet valve 84 for the steam in such a manner that the cylinder 82 is set in operation and the nozzle 81 towards the intake chamber 8 is opened. The steam arrives in the treatment chamber 4, drawing the milk by means of the tube 87 and the air through the channel 100 into the treatment chamber 4.

As the milk arrives in the treatment chamber 4, it is emulsified with the air and progressively dissolves the granules of coffee, producing cappuccino in an increasing quantity. When the treatment chamber 4 is full, the cappuccino flows through the outlet pipe 60 which is provided in the cover 6 and communicates with the tube 43 for distribution into the cup. When the desired quantity of cappuccino is collected, the hand-grip 13' is rotated in a clockwise direction by approximately 160°, to the initial position, so as to intercept the admission of the steam, of the milk, and of the air and to open the emptying valve 7 of the treatment chamber 4, thus restoring the start of cycle conditions.

In practice, however, the embodiment details can vary in equivalent manner in form, dimensions, arrangement of the elements, nature of the materials used, without moreover departing from the scope of the idea for solution adopted and therefore remaining within the limits of the protection accorded by the present patent of industrial invention.

I claim:

1. A device for dissolving a substantially soluble product in a liquid, the device comprising:
   dispensing means for dispensing a predetermined dose of the substantially soluble product;
   a treatment chamber positioned next to said dispensing means for receiving said predetermined dose;
   mixing/dissolving means for mixing and substantially dissolving said predetermined dose with the liquid and with air, said mixing/dissolving means being connected to said treatment chamber and delivering the liquid and air to said treatment chamber by steam from a steam pipe, said mixing/dissolving means has an intake chamber, said intake chamber has an inlet for the steam, the liquid and the air, said intake chamber also has an outlet for communicating with said treatment chamber;
   supply means for supplying the liquid and air to said mixing/dissolving means, said supply means has an operating valve acted on by an operating cylinder, said operating cylinder is set in operation by said steam, said supply means has an oscillating tube for said supplying of the liquid to said mixing/dissolving means, said oscillating tube moving between a substantially horizontal rest position to a substantially vertical take-up position, said substantially vertical position being coincident with an opening of a valve of a calibrated nozzle for admission of the liquid into said intake chamber;
   delivery means for delivering the predetermined dose, mixed and dissolved in the liquid and air, from said treatment chamber;
   movement means for supplying movement to said dispensing means, said mixing/dissolving means, said supply means and said delivery means, said movement means comprises a rotatable disk, said rotatable disk is provided with a plurality of cams supplying said movement to said dispensing means, said mixing/dissolving means, said supply means and said delivery means, one of said plurality of cams moving said oscillating tube between said positions.

2. A device in accordance with claim 1, wherein:
   said inlet on said intake chamber for the air is separate from said inlet on said intake chamber for the liquid, said inlet on said intake chamber for the air surrounds and is outside said inlet on said intake chamber for the liquid.

3. A device for dissolving a substantially soluble product in a liquid, the device comprising:
   dispensing means for dispensing a predetermined dose of the substantially soluble product;
   a treatment chamber positioned next to said dispensing means for receiving said predetermined dose;
   mixing/dissolving means for mixing and substantially dissolving said predetermined dose with the liquid and with air, said mixing/dissolving means being connected to said treatment chamber and delivering the liquid and air to said treatment chamber by steam from a steam pipe, said mixing/dissolving means having an intake chamber, said intake chamber has an inlet for the steam, the liquid and the air, said intake chamber also has an outlet for communicating with said treatment chamber;
   supply means for supplying the liquid and air to said mixing/dissolving means, said supply means has an operating valve acted on by an operating cylinder, said operating cylinder is set in operation by the steam;
   delivery means for emptying said treatment chamber, by delivering the predetermined dose, mixed and dissolved in the liquid and air, from said treatment chamber; and
   movement means for supplying movement to said dispensing means, said mixing/dissolving means, said supply means and said delivery means.

4. A device in accordance with claim 3, further comprising:
   starting means for unlocking the movement means and allowing movement when said steam is above a predetermined pressure and said starting means locking said movement means when said steam is below said predetermined pressure.

5. A device in accordance with claim 3 wherein:
   said supply means and said mixing/dissolving means supplies and mixes milk.

6. A device in accordance with claim 3 wherein:
   said movement means comprises a rotatable disk, said rotatable disk is provided with a plurality of cams supplying said movement to said dispensing means, said mixing/dissolving means, said supply means and said delivery means.

7. A device in accordance with claim 6, wherein:
   one of said plurality of cams lifts a cover off said treatment chamber; and
   said rotatable disk has a control hand-grip.

8. A device in accordance with claim 6, wherein:
   said rotatable disk defines a notch engaging with a tooth for retaining said rotatable disk in an inactive position.

9. A device in accordance with claim 3, wherein:
   said dispensing means has a magazine means for holding a supply of the substantially soluble product, a loader movable between a bottom of said magazine and a top of said treatment chamber on a track, said loader having a box-like form opened at a top and a bottom, said box-like form having a capacity substantially equal to said predetermined dose, said loader having a first closing means for closing said magazine means when said box-like form is not under said magazine, and said loader having a second closing means for closing said bottom of said box-like form when said box-like form is not over said treatment chamber;
   said treatment chamber has a cover; and
   connection means for moving said loader above said treatment chamber when said cover is lifted off said treatment chamber.

10. A device in accordance with claim 9, further comprising:
    hot air diffuser means for producing a downward flow of substantially dry hot air capable of drying, heating and cleaning said box-like form, said hot air diffuser positioned above said loader.

11. A device in accordance with claim 9, wherein:
said delivery means has an outlet pipe on said cover, said outlet pipe leading to a sealing valve and said sealing valve having a lower opening.

12. A device in accordance with claim 11, wherein:
said sealing valve is opened and closed by a first lever, said first lever being moved by a spring and a second lever, and said second lever being acted on by another one of said plurality of cams.

* * * * *